US009448946B2

(12) United States Patent
Higgins et al.

(10) Patent No.: US 9,448,946 B2
(45) Date of Patent: Sep. 20, 2016

(54) DATA STORAGE SYSTEM WITH STALE DATA MECHANISM AND METHOD OF OPERATION THEREOF

(71) Applicant: Smart Storage Systems, Inc., Milpitas, CA (US)

(72) Inventors: James M. Higgins, Chandler, AZ (US); Theron W. Virgin, Gilbert, AZ (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 157 days.

(21) Appl. No.: 14/332,259

(22) Filed: Jul. 15, 2014

(65) Prior Publication Data

US 2015/0046665 A1   Feb. 12, 2015

Related U.S. Application Data

(60) Provisional application No. 61/863,420, filed on Aug. 7, 2013.

(51) Int. Cl.
*G06F 12/10* (2016.01)
*G06F 3/06* (2006.01)
*G06F 12/02* (2006.01)

(52) U.S. Cl.
CPC .......... *G06F 12/1009* (2013.01); *G06F 3/061* (2013.01); *G06F 3/0619* (2013.01); *G06F 3/0659* (2013.01); *G06F 3/0679* (2013.01); *G06F 12/023* (2013.01)

(58) Field of Classification Search
CPC .... G06F 3/0659; G06F 3/061; G06F 12/084; G06F 13/1673; G06F 13/1663; G06F 2212/7201
See application file for complete search history.

(56) References Cited

U.S. PATENT DOCUMENTS

| 4,048,481 A | 9/1977 | Bailey, Jr. et al. |
| 5,034,744 A | 7/1991 | Obinata |

(Continued)

FOREIGN PATENT DOCUMENTS

| EP | 1 956 489 A2 | 8/2008 |
| EP | 1 990 921 A2 | 11/2008 |

(Continued)

OTHER PUBLICATIONS

International Search Report and Written Opinion dated Oct. 17, 2014, received in international Patent Application No. PCT/US2014/049734, which corresponds to U.S. Appl. No. 14/332,259, 8 pages (Higgins).

(Continued)

*Primary Examiner* — Reginald Bragdon
*Assistant Examiner* — Thanh Vo
(74) *Attorney, Agent, or Firm* — Morgan, Lewis & Bockius LLP (57) ABSTRACT

Systems, methods and/or devices are used to enable a stale data mechanism. In one aspect, the method includes (1) receiving a write command specifying a logical address to which to write, (2) determining whether a stale flag corresponding to the logical address is set, (3) in accordance with a determination that the stale flag is not set, setting the stale flag and releasing the write command to be processed, and (4) in accordance with a determination that the stale flag is set, detecting an overlap, wherein the overlap indicates two or more outstanding write commands are operating on the same memory space.

20 Claims, 5 Drawing Sheets

Overlap exists and needs to be detected

(56) References Cited

U.S. PATENT DOCUMENTS

| | | |
|---|---|---|
| 5,210,854 A | 5/1993 | Beaverton et al. |
| 5,311,395 A | 5/1994 | McGaha et al. |
| 5,450,354 A | 9/1995 | Sawada et al. |
| 5,479,638 A | 12/1995 | Assar et al. |
| 5,784,174 A | 7/1998 | Fujino et al. |
| 5,790,828 A | 8/1998 | Jost |
| 5,930,504 A | 7/1999 | Gabel |
| 5,949,785 A | 9/1999 | Beasley |
| 5,963,983 A | 10/1999 | Sakakura et al. |
| 6,034,897 A | 3/2000 | Estakhri et al. |
| 6,069,827 A | 5/2000 | Sinclair |
| 6,091,652 A | 7/2000 | Haehn et al. |
| 6,275,436 B1 | 8/2001 | Tobita et al. |
| 6,345,367 B1 | 2/2002 | Sinclair |
| 6,356,447 B2 | 3/2002 | Scafidi |
| 6,381,176 B1 | 4/2002 | Kim et al. |
| 6,381,670 B1 | 4/2002 | Lee et al. |
| 6,412,080 B1 | 6/2002 | Fleming et al. |
| 6,529,997 B1 | 3/2003 | Debiez et al. |
| 6,552,581 B1 | 4/2003 | Gabara |
| 6,587,915 B1 | 7/2003 | Kim |
| 6,618,249 B2 | 9/2003 | Fairchild |
| 6,661,503 B1 | 12/2003 | Yamaguchi et al. |
| 6,728,913 B1 | 4/2004 | Parker |
| 6,763,424 B2 | 7/2004 | Conley |
| 6,775,792 B2 | 8/2004 | Ulrich et al. |
| 6,778,387 B2 | 8/2004 | Fairchild |
| 6,850,443 B2 | 2/2005 | Lofgren et al. |
| 6,854,070 B2 | 2/2005 | Johnson et al. |
| 6,871,304 B2 | 3/2005 | Hadjihassan et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 7,082,495 B2 | 7/2006 | DeWhitt et al. |
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,298,888 B2 | 11/2007 | Hamar |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,558,109 B2 | 7/2009 | Brandman et al. |
| 7,613,871 B2 | 11/2009 | Tanaka et al. |
| 7,620,710 B2 | 11/2009 | Kottomtharayil et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,693,422 B2 | 4/2010 | Alicherry et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,853,749 B2 | 12/2010 | Kolokowsky |
| 7,979,614 B1 | 7/2011 | Yang |
| 8,000,161 B2 | 8/2011 | Stan et al. |
| 8,001,135 B2 | 8/2011 | Perlmutter et al. |
| 8,010,738 B1 | 8/2011 | Chilton et al. |
| 8,028,123 B2 | 9/2011 | Kilzer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,205,028 B1 | 6/2012 | Sakarda |
| 8,209,677 B2 | 6/2012 | Shintani et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,250,621 B2 | 8/2012 | Cha |
| 8,254,172 B1 | 8/2012 | Kan |
| 8,259,506 B1 | 9/2012 | Sommer et al. |
| 8,289,801 B2 | 10/2012 | Smith et al. |
| 8,296,534 B1 | 10/2012 | Gupta et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,386,860 B2 | 2/2013 | Tseng et al. |
| 8,397,101 B2 | 3/2013 | Goss et al. |
| 8,407,409 B2 | 3/2013 | Kawaguchi |
| 8,464,106 B2 | 6/2013 | Filor et al. |
| 8,503,238 B1 | 8/2013 | Wu et al. |
| 8,521,981 B2 | 8/2013 | Strauss et al. |
| 8,560,770 B2 | 10/2013 | Haines et al. |
| 8,601,203 B2 | 12/2013 | Holbrook et al. |
| 8,612,669 B1 | 12/2013 | Syu et al. |
| 8,612,804 B1 | 12/2013 | Kang et al. |
| 8,661,184 B2 | 2/2014 | Wood et al. |
| 8,694,811 B2 | 4/2014 | Raju et al. |
| 8,725,931 B1 | 5/2014 | Kang |
| 8,750,052 B2 | 6/2014 | Aoki et al. |
| 8,793,556 B1 | 7/2014 | Northcott et al. |
| 8,799,747 B2 | 8/2014 | Goss et al. |
| 8,832,506 B2 | 9/2014 | Griffin et al. |
| 8,862,818 B1 | 10/2014 | Ozdemir |
| 8,880,838 B2 | 11/2014 | Kaiser et al. |
| 8,984,216 B2 | 3/2015 | Fillingim |
| 9,043,668 B2 | 5/2015 | Goss et al. |
| 9,063,844 B2 | 6/2015 | Higgins et al. |
| 9,069,468 B2 | 6/2015 | Mehra et al. |
| 9,116,401 B2 | 8/2015 | Kim et al. |
| 2002/0056025 A1 | 5/2002 | Qiu et al. |
| 2002/0156891 A1 | 10/2002 | Ulrich et al. |
| 2002/0159285 A1 | 10/2002 | Morley et al. |
| 2003/0033308 A1 | 2/2003 | Patel et al. |
| 2003/0046603 A1 | 3/2003 | Harari et al. |
| 2003/0074592 A1 | 4/2003 | Hasegawa |
| 2003/0163633 A1 | 8/2003 | Aasheim et al. |
| 2004/0080985 A1 | 4/2004 | Chang et al. |
| 2004/0088511 A1 | 5/2004 | Bacon et al. |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2005/0076102 A1 | 4/2005 | Chen et al. |
| 2005/0144516 A1 | 6/2005 | Gonzalez et al. |
| 2006/0015683 A1 | 1/2006 | Ashmore et al. |
| 2006/0020745 A1 | 1/2006 | Conley et al. |
| 2006/0022054 A1 | 2/2006 | Elhamias et al. |
| 2006/0080505 A1 | 4/2006 | Arai et al. |
| 2006/0136682 A1 | 6/2006 | Haridas et al. |
| 2006/0143365 A1 | 6/2006 | Kikuchi |
| 2006/0143475 A1 | 6/2006 | Herbert et al. |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0050536 A1 | 3/2007 | Kolokowsky |
| 2007/0061511 A1 | 3/2007 | Faber |
| 2007/0067598 A1 | 3/2007 | Fujimoto |
| 2007/0079152 A1 | 4/2007 | Winick et al. |
| 2007/0083779 A1 | 4/2007 | Misaka et al. |
| 2007/0226592 A1 | 9/2007 | Radke |
| 2007/0234004 A1 | 10/2007 | Oshima et al. |
| 2007/0260811 A1 | 11/2007 | Merry, Jr. et al. |
| 2007/0263444 A1 | 11/2007 | Gorobets et al. |
| 2007/0276973 A1 | 11/2007 | Tan et al. |
| 2008/0028246 A1 | 1/2008 | Witham |
| 2008/0046630 A1 | 2/2008 | Lasser |
| 2008/0052446 A1 | 2/2008 | Lasser et al. |
| 2008/0082736 A1 | 4/2008 | Chow et al. |

(56) References Cited

U.S. PATENT DOCUMENTS

| | | |
|---|---|---|
| 2008/0126720 A1 | 5/2008 | Danilak |
| 2008/0183918 A1 | 7/2008 | Dhokia et al. |
| 2008/0189588 A1 | 8/2008 | Tanaka et al. |
| 2008/0263289 A1 | 10/2008 | Hosoya et al. |
| 2008/0313505 A1 | 12/2008 | Lee et al. |
| 2009/0006900 A1 | 1/2009 | Lastras-Montano et al. |
| 2009/0019321 A1 | 1/2009 | Radke |
| 2009/0070651 A1 | 3/2009 | Diggs et al. |
| 2009/0083587 A1 | 3/2009 | Ng et al. |
| 2009/0089485 A1 | 4/2009 | Yeh |
| 2009/0091990 A1 | 4/2009 | Park et al. |
| 2009/0109786 A1 | 4/2009 | Ye et al. |
| 2009/0125670 A1 | 5/2009 | Keays |
| 2009/0132756 A1 | 5/2009 | Hsieh |
| 2009/0138654 A1 | 5/2009 | Sutardja |
| 2009/0146721 A1 | 6/2009 | Kurooka et al. |
| 2009/0157948 A1 | 6/2009 | Trichina et al. |
| 2009/0164702 A1 | 6/2009 | Kern |
| 2009/0164710 A1 | 6/2009 | Choi et al. |
| 2009/0172248 A1 | 7/2009 | You |
| 2009/0172262 A1 | 7/2009 | Olbrich et al. |
| 2009/0179707 A1 | 7/2009 | Higashino |
| 2009/0183183 A1 | 7/2009 | Muppirala et al. |
| 2009/0228634 A1 | 9/2009 | Nakamura et al. |
| 2009/0228761 A1 | 9/2009 | Perlmutter et al. |
| 2009/0259819 A1 | 10/2009 | Chen et al. |
| 2009/0259896 A1 | 10/2009 | Hsu et al. |
| 2009/0271562 A1 | 10/2009 | Sinclair |
| 2009/0287975 A1 | 11/2009 | Kim et al. |
| 2009/0300238 A1 | 12/2009 | Panabaker et al. |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0082890 A1 | 4/2010 | Heo et al. |
| 2010/0122019 A1 | 5/2010 | Flynn et al. |
| 2010/0128537 A1 | 5/2010 | Suhail et al. |
| 2010/0138592 A1 | 6/2010 | Cheon |
| 2010/0165689 A1 | 7/2010 | Rotbard et al. |
| 2010/0169541 A1 | 7/2010 | Freikorn |
| 2010/0172179 A1 | 7/2010 | Gorobets et al. |
| 2010/0174845 A1 | 7/2010 | Gorobets et al. |
| 2010/0217898 A1 | 8/2010 | Priborsky et al. |
| 2010/0217915 A1 | 8/2010 | O'Connor et al. |
| 2010/0223531 A1 | 9/2010 | Fukutomi et al. |
| 2010/0228928 A1 | 9/2010 | Asnaashari et al. |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0287328 A1 | 11/2010 | Feldman et al. |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0325340 A1 | 12/2010 | Feldman et al. |
| 2010/0332726 A1 | 12/2010 | Wang |
| 2011/0002224 A1 | 1/2011 | Tamura |
| 2011/0016239 A1 | 1/2011 | Stenfort |
| 2011/0055455 A1 | 3/2011 | Post et al. |
| 2011/0055468 A1 | 3/2011 | Gonzalez et al. |
| 2011/0066788 A1 | 3/2011 | Eleftheriou et al. |
| 2011/0072423 A1 | 3/2011 | Fukata |
| 2011/0078393 A1* | 3/2011 | Lin ................ G06F 13/1642 711/155 |
| 2011/0099342 A1 | 4/2011 | Ozdemir |
| 2011/0107144 A1 | 5/2011 | Ohara |
| 2011/0131365 A1 | 6/2011 | Zhang et al. |
| 2011/0131447 A1 | 6/2011 | Prakash et al. |
| 2011/0138100 A1 | 6/2011 | Sinclair |
| 2011/0145473 A1 | 6/2011 | Maheshwari |
| 2011/0161775 A1 | 6/2011 | Weingarten |
| 2011/0190963 A1 | 8/2011 | Glassl et al. |
| 2011/0191522 A1 | 8/2011 | Condict et al. |
| 2011/0191649 A1 | 8/2011 | Lim et al. |
| 2011/0209032 A1 | 8/2011 | Choi et al. |
| 2011/0238892 A1 | 9/2011 | Tsai et al. |
| 2011/0239088 A1 | 9/2011 | Post |
| 2011/0258496 A1 | 10/2011 | Tseng et al. |
| 2011/0314219 A1 | 12/2011 | Ulrich et al. |
| 2011/0320687 A1 | 12/2011 | Belluomini et al. |
| 2012/0008401 A1 | 1/2012 | Katz et al. |
| 2012/0011336 A1 | 1/2012 | Saika |
| 2012/0023144 A1 | 1/2012 | Rub |
| 2012/0047318 A1 | 2/2012 | Yoon et al. |
| 2012/0047320 A1 | 2/2012 | Yoo et al. |
| 2012/0047409 A1 | 2/2012 | Post et al. |
| 2012/0066450 A1 | 3/2012 | Yochai et al. |
| 2012/0079348 A1 | 3/2012 | Naeimi |
| 2012/0079355 A1 | 3/2012 | Patapoutian et al. |
| 2012/0096217 A1 | 4/2012 | Son et al. |
| 2012/0124046 A1 | 5/2012 | Provenzano |
| 2012/0124273 A1 | 5/2012 | Goss et al. |
| 2012/0151260 A1 | 6/2012 | Zimmermann et al. |
| 2012/0170365 A1 | 7/2012 | Kang et al. |
| 2012/0185706 A1 | 7/2012 | Sistla et al. |
| 2012/0213004 A1 | 8/2012 | Yun et al. |
| 2012/0216085 A1 | 8/2012 | Weingarten et al. |
| 2012/0236656 A1 | 9/2012 | Cometti |
| 2012/0239858 A1 | 9/2012 | Melik-Martirosian |
| 2012/0254686 A1 | 10/2012 | Esumi et al. |
| 2012/0266011 A1 | 10/2012 | Storer et al. |
| 2012/0266048 A1 | 10/2012 | Chung et al. |
| 2012/0278530 A1 | 11/2012 | Ebsen |
| 2012/0278531 A1 | 11/2012 | Horn |
| 2012/0284587 A1 | 11/2012 | Yu et al. |
| 2012/0297113 A1 | 11/2012 | Belluomini et al. |
| 2012/0311402 A1 | 12/2012 | Tseng et al. |
| 2012/0317334 A1 | 12/2012 | Suzuki et al. |
| 2012/0324191 A1 | 12/2012 | Strange et al. |
| 2012/0331207 A1 | 12/2012 | Lassa et al. |
| 2013/0007380 A1 | 1/2013 | Seekins et al. |
| 2013/0007543 A1 | 1/2013 | Goss et al. |
| 2013/0054881 A1 | 2/2013 | Ellis et al. |
| 2013/0060994 A1 | 3/2013 | Higgins et al. |
| 2013/0061019 A1 | 3/2013 | Fitzpatrick et al. |
| 2013/0073788 A1 | 3/2013 | Post et al. |
| 2013/0073797 A1 | 3/2013 | Chowdhury |
| 2013/0074093 A1 | 3/2013 | Gounares et al. |
| 2013/0080691 A1 | 3/2013 | Weingarten et al. |
| 2013/0094289 A1 | 4/2013 | Sridharan et al. |
| 2013/0100600 A1 | 4/2013 | Yin et al. |
| 2013/0104005 A1 | 4/2013 | Weingarten et al. |
| 2013/0124792 A1 | 5/2013 | Melik-Martirosian et al. |
| 2013/0151753 A1 | 6/2013 | Jeon et al. |
| 2013/0198436 A1 | 8/2013 | Bandic et al. |
| 2013/0205102 A1 | 8/2013 | Jones et al. |
| 2013/0219248 A1* | 8/2013 | Sakurai ................ G06F 11/1084 714/766 |
| 2013/0232290 A1 | 9/2013 | Ish et al. |
| 2013/0238833 A1 | 9/2013 | Vogan et al. |
| 2013/0265825 A1 | 10/2013 | Lassa |
| 2013/0304998 A1* | 11/2013 | Palmer ................ G06F 3/0619 711/154 |
| 2013/0326116 A1 | 12/2013 | Goss et al. |
| 2013/0332791 A1 | 12/2013 | Chu |
| 2014/0036589 A1 | 2/2014 | Parthasarathy et al. |
| 2014/0059359 A1 | 2/2014 | Bahirat |
| 2014/0108891 A1 | 4/2014 | Strasser et al. |
| 2014/0129874 A1 | 5/2014 | Zaltsman et al. |
| 2014/0158525 A1 | 6/2014 | Greene |
| 2014/0181370 A1 | 6/2014 | Cohen et al. |
| 2014/0208174 A1 | 7/2014 | Ellis et al. |
| 2014/0258769 A1 | 9/2014 | Baryudin et al. |
| 2014/0372777 A1 | 12/2014 | Reller et al. |

FOREIGN PATENT DOCUMENTS

| | | |
|---|---|---|
| EP | 2 498 259 A2 | 9/2012 |
| JP | 2012129859 A | 7/2012 |

(56) References Cited

FOREIGN PATENT DOCUMENTS

WO     WO 2009/042298 A1     4/2009
WO     WO 2011/156466        12/2011

OTHER PUBLICATIONS

International Search Report and Written Opinion dated Oct. 23, 2014, received in International Patent Application No. PCT/US2014/049736, which corresponds to U.S. Appl. No. 14/446,249 8 pages (Fitzpatrick).
Internationai Search Report and Written Opinion dated Nov. 7, 2014 in International Patent Application No. PCT/US2014/049732, which corresponds to U.S. Appl. No. 14/334,350, 13 pages (Fitzpatrick).
International Search Report and Written Opinion dated Nov. 5, 2014, received in International Patent Application No. PCT/US2014/049282, which corresponds to U.S. Appl. No. 13/957,407, 12 pages (Fitzpatrick).
Narayanan et al., "Migrating Server Storage to SSDs: Analysis of Tradeoffs, " Computer Systems, Apr. 2009, 12 pages.
Shiraz et al., "Block Aging Prevention Technique (BAP) for Flash Based Solid State Disks," 7th International Conference on Emerging Technologies (ICET), Sep. 5, 2011, 6 pages.
Tai et al, "Prolongation of Lifetime and the Evaluation Method of Dependable SSD," 25 International Symposium on Defect and Fault Tolerance in VLSI Systems, 2010, NJ, USA, 8 pages.
Tseng et al., "Understanding the Impact of Power Loss on Flash Memory," DAC'11, Jun. 5-10, 2011, San Diego, California, 6 pages.
Yimo et al. "WeLe-RAID: A SSD-Based RAID for System Endurance and Performance," Jan. 2011, Network and Parallel Computing, Springer, 14 pages.
International Search Report and Written Opinion dated Jan. 9, 2015, received in International Patent Application No. PCT/US2014/049731, which corresponds to U.S. Appl. No. 14/334,324, 9 pages, (Fitzpatrick).
International Search Report and Written Opinion dated Feb. 18, 2015, received in International Patent Application No. PCT/US2014/065401, which corresponds to U.S. Appl. No. 14/082,031, 9 pages, (Higgins).
International Search Report dated Apr. 15, 2014, received in international Patent Application No. PCT/US2013/078340, which corresponds to U.S. Appl. No. 13/746,542, 11 pages (Ellis).
International Search Report and Written Opinion dated Aug. 22, 2014, received in International Patent Application No. PCT/US2014/032978, which corresponds to U.S. Appl. No. 14/081,992, 10 pages (Ellis).
Cooke, "Introduction to Flash Memory (TIA)," Flash Memory Summit, Aug. 22, 2008, Micron Technology, Inc., 102 pages.
Gal et al., "Algorithms and Data Structures for Flash Memories," ACM Computing Surveys, Jun. 2005, vol. 37, No. 2, 30 pages.
IBM Corporation, "Systems Management, Work Management," Version 5, Release 4, 9th Edition, Feb. 2006, pp. 1-21.
O'Brien, "SMART Storage Systems Optimus SAS Enterprise SSD Review," SMART Storage Systems, Oct. 9, 2012, 44 pages.
Spanjer, "Flash Management—Why and How?" Smart Modular Technologies, Nov. 2009, http://www.scantec.de/fileadmin/pdf/Smart_Modular/Flash-Management.pdf, 14 pages.
Texas Instruments, "Power Management IC for Digital Set Top Boxes," SLVSA10A, Sep. 2009, pp. 1-22.
Ulinktech, "ATA Command Table (in Alphabetic Order)," Feb. 6, 2011, https://web.archive.org/web/20110206060820/http://www.ulinktech.com/downloads/AT, 6 pages.
International Search Report and Written Opinion dated May 14, 2014, received in International Patent Application No. PCT/US2014/017168, which corresponds to U.S. Appl. No. 14/076,115, 6 pages (Fitzpatrick).
International Search Report and Written Opinion dated May 14, 2014, received in International Patent Application No. PCT/US2014/017169, which corresponds to U.S. Appl. No. 14/076,148, 6 pages (Fitzpatrick).
International Search Report and Written Opinion dated Dec. 20, 2013, received in PCT/US2013/045282, which corresponds to U.S. Appl. No. 13/493,949, 7 pages (Ellis).
International Search Report dated Mar. 25, 2014, received in International Patent Application No. PCT/US2013/072400, which corresponds to U.S. Appl. No. 13/690,337, 3 pages (Ellis).
International Search Report and Written Opinion dated Jun. 12, 2014, received in PCT/US2014/018972, which corresponds to U.S. Appl. No. 13/779,352, 12 pages (Schmier).
Invitation to Pay Additional Fees dated Jul. 25, 2014, received in International Patent Application No. PCT/US2014/021290, which corresponds to U.S. Appl. No. 13/791,797, 8 pages (Dean).
International Search Report and Written Opinion dated Jul. 31, 2014, received in International Patent Application No. PCT/US2014/031465, which corresponds to U.S. Appl. No. 13/851,928,13 pages (Ellis).
International Search Report and Written Opinion dated Jul. 31, 2014, received in International Patent Application No. PCT/US2014/033876, which corresponds to U.S. Appl. No. 13/861,326, 9 pages (Fitzpatrick).
Online Merriam Webster Dictionary, definition of "Distinct" from Jun. 12, 2011, https://web.archive.org/web/20110612181129/http://www2.merriam-webster.com/cgi-bin/mwdictadu?book=Dictionary&va=distinct.

* cited by examiner

DATA STORAGE SYSTEM WITH STALE DATA MECHANISM AND METHOD OF OPERATION THEREOF

RELATED APPLICATION

This application claims priority to U.S. Provisional Patent Application Ser. No. 61/863,420, filed Aug. 7, 2013, entitled "Data Storage System with Stale Data Mechanism and Method of Operation Thereof," which is hereby incorporated by reference in its entirety.

TECHNICAL FIELD

The present invention relates generally to a data storage system and more particularly to a system with a stale data mechanism.

BACKGROUND

Data storage, often called storage or memory, refers to computer components and recording media that retain digital data. Data storage is a core function and fundamental component of consumer and industrial electronics, especially devices such as computers, televisions, cellular phones, mobile devices, and digital video cameras.

Recently, forms of long-term storage other than electromechanical hard disks have become feasible for use in computers. NOT-AND (NAND) flash is one form of non-volatile memory used in solid-state storage devices. The memory cells are arranged in typical row and column fashion with circuitry for accessing individual cells. The memory transistors of those cells are placed to store an analog value that can be interpreted to hold two logical states in the case of Single Level Cell (SLC) or more than two logical states in the case of Multi Level Cell (MLC).

A flash memory cell is light in weight, occupies very little space, and consumes less power than electromechanical disk drives. Construction of a storage system with this type of memory allows for much higher bandwidths and input/output operations per second (IOPS) than typical electromechanical disk drives. More importantly, it is especially rugged and can operate at a much high temperature range. It will withstand without adverse effects repeated drops, each of which would destroy a typical electromechanical hard disk drive. A problem exhibited by flash memory is that it tends to have a limited operational speed.

Thus, a need still remains for faster data storage systems. In view of the increasing demand for data storage systems, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DETAILED DESCRIPTION

The various implementations described herein include systems, methods and/or devices used to enable a stale data mechanism. Some implementations include systems, methods and/or devices to determine whether a stale flag corresponding to a logical address of a write command is set, and in accordance with a determination that the stale flag is set, detect an overlap, which indicates two or more outstanding write commands are operating on the same memory space.

More specifically, some embodiments include a method of operation of a data storage system. In some embodiments, the method includes (1) receiving a write command specifying a logical address to which to write, (2) determining whether a stale flag corresponding to the logical address is set, (3) in accordance with a determination that the stale flag is not set, setting the stale flag and releasing the write command to be processed, and (4) in accordance with a determination that the stale flag is set, detecting an overlap, wherein the overlap indicates two or more outstanding write commands are operating on the same memory space.

In some embodiments, the method further includes, in response to detecting an overlap, performing a write-merge operation, wherein the write-merge operation consolidates the two or more outstanding write commands to the logical address.

In some embodiments, the method further includes (1) completing processing of the write command, and (2) updating the stale flag.

In some embodiments, updating the stale flag includes clearing the stale flag.

In some embodiments, the stale flag is a count of a number of outstanding write commands associated with a respective logical address, and updating the stale flag includes decrementing the count.

In some embodiments, the method further includes (1) receiving a read command specifying a second logical address from which to read, (2) determining whether a second stale flag corresponding to the second logical address is set, (3) in accordance with a determination that the second stale flag is not set, performing the read command, wherein performing the read command includes reading data from a physical address corresponding to the second logical address, wherein the physical address is determined using a logical-to-physical table, and (4) in accordance with a determination that the second stale flag is set, skipping performance of the read command until the second stale flag is not set.

In some embodiments, the method further includes, in accordance with a determination that the second stale flag is set, prioritizing a stale write, wherein completion of the stale write clears the second stale flag.

In some embodiments, the method further includes (1) receiving a read command specifying a second logical address from which to read, (2) determining whether a second stale flag corresponding to the second logical address is set, (3) in accordance with a determination that the second stale flag is not set, performing the read command, wherein performing the read command includes reading data from a physical address corresponding to the second logical address, wherein the physical address is determined using a logical-to-physical table, and (4) in accordance with a determination that the second stale flag is set, servicing the read command by reading data from in-flight write data for the second logical address.

In some embodiments, each logical address of a plurality of logical addresses has a corresponding stale flag and each stale flag is stored in a logical-to-physical table used for mapping logical addresses to physical addresses.

In some embodiments, each logical address of a plurality of logical addresses has a corresponding stale flag and each stale flag is stored in a separate table from a logical-to-physical table used for mapping logical addresses to physical addresses.

In another aspect, any of the methods described above are performed by a data storage system, the data storage system including (1) one or more processors, and (2) memory storing one or more programs to be executed by the one or more processors, the one or more programs comprising instructions for performing or controlling performance of any of the methods described herein.

In yet another aspect, some embodiments include a non-transitory computer readable storage medium, storing one or more programs configured for execution by one or more processors of a data storage system, the one or more programs including instructions for performing or controlling performance of any of the methods described herein.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

The term "SSD" referred to herein is defined as a solid-state disk drive, currently today these types of devices use NAND flash as a storage medium. The term "read-modify-write" referred to herein is defined as the process of reading a memory block from memory, updating a sub region of operation that memory and then writing the entire memory region back out to the media.

The term "erase block" referred to herein is defined as a group of pages, which is the smallest number of pages that are erased at one time. The term "memory page" referred to herein is defined as a memory component within an erase block that is programmed as an individual unit. The memory page is a smallest group of data bytes that are read from or written to in an erase block.

The term "bit error rate" (BER) referred to herein is defined as a number of incorrect bits in a data stream stored in a memory device including NAND. The term "error correction code" referred to herein is defined as data generated over a set of data to correct errors.

The term "retention" referred to herein is defined as an ability of memory cells to retain the programmed or correct information. Retention refers to an amount of correct data after a given period, which is a time when a drive is powered, not powered, or a combination thereof. The term "program erase cycle" (PE cycle) referred to herein is defined as a base level operation of how data is replaced within an erase block. For example, a memory device including NAND and other memory types can have a limited number of useful PE cycles.

The term "age" referred to herein indicates how long a storage system or a memory component has existed or has been in operation. For example, the age can be based on a number of erase cycles, how long it has been since the last time an erase block was written, an average BER an erase block is yielding, a temperature at which a device has been run, or a combination thereof.

The term "DMA" referred to herein is defined as a feature of modern computers which allows hardware subsystems to access memory subsystems independent of the CPU. The term "logical-to-physical table" (L2P) referred to herein is defined as a table in memory which maps logical pages to physical flash memory addresses.

The term "command overlap" referred to herein is defined as the act of having multiple commands to overlapping memory locations in-flight simultaneously. The term "overlap detection" referred to herein is defined as the act of determining if two outstanding commands are operating on the same memory space.

The term "logical page" referred to herein is defined as the smallest data block that can be individually addressed internal to the SSD. The term "host" referred to herein is defined as an external system that interacts with the SSD. The term "host operations" is defined as reads and writes submitted by a system external to the SSD.

The term "stale flag" referred to herein is defined as a parameter associated with a logical page or collection of logical pages that indicates whether the data on the media is the most current data for that logical page or collection of logical pages. The term "queue depth" referred to herein is defined as the number of host commands that a storage device can be working on at one time.

Figure 1:
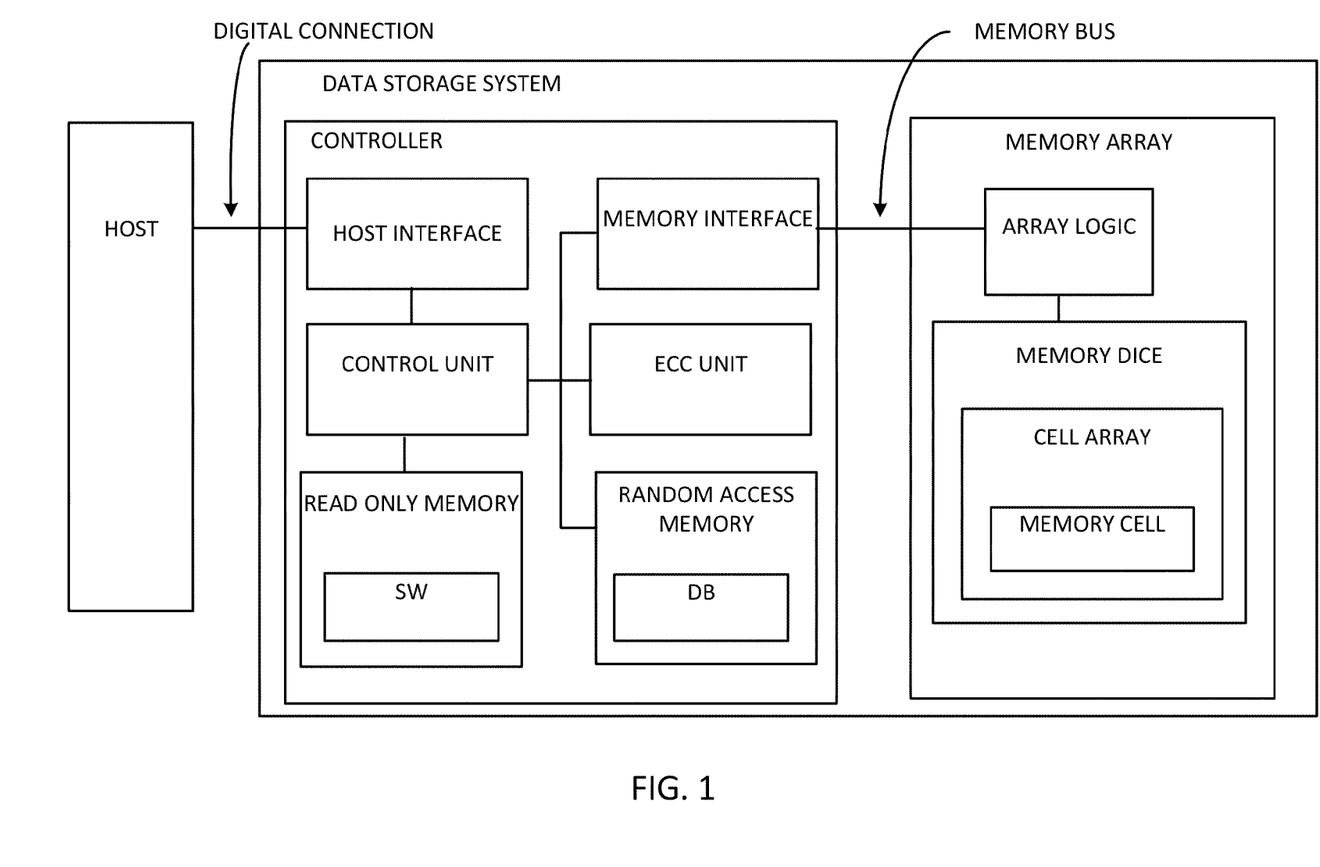
FIG. 1 is a block diagram of a data storage system in an embodiment of the present invention.

Referring now to FIG. 1, therein is shown a block diagram of a data storage system in an embodiment of the present invention. The data storage system includes a memory array coupled to a controller via a memory bus.

The controller is a processing unit for managing the storage and retrieval of data in the memory array. The controller can be an embedded processor, control logic, or a combination thereof. The controller can transfer stored data from the memory array to a host device.

The memory array is a non-volatile memory unit for storing data. The memory array can include NAND flash memory arrays, NOR flash memory arrays, other non-volatile memory arrays, or a combination thereof.

The memory array can be formed with memory dice. The memory dice are semiconductor devices for storing information. The memory dice are the minimum unit that can independently execute commands and report status. For example, the memory dice can be flash memory devices, NAND flash memory chips, NOR flash memory devices, or a combination thereof.

The memory bus is a communication channel. The memory bus conveys data and control information between the controller and the memory array.

The memory dice can include a cell array. The cell array is a set of non-volatile flash memory cells for storing data. For example, the cell array can include a single-level cell flash memory, a multi-level cell flash memory, a mixed functionality cell, or a combination thereof.

The cell array can include memory cells. The memory cells are electronic structures for storing information. For example, the memory cells can be floating gate flash memory devices.

The memory array can include an array logic unit coupled to the cell array. The array logic unit is circuitry to provide addressing, data transfer and sensing, and other support to control the memory array for saving and retrieving information from the cell array.

The controller can include a memory interface coupled to the memory array. The memory interface can include circuitry for communicating with the memory array over the memory bus.

The controller can include a control unit coupled to the memory interface and a host interface. A read only memory can be coupled to the control unit. A random access memory can be coupled to the control unit and to the read only memory. The random access memory can be utilized as a buffer memory for temporary storage of data being written to or read from the memory array.

The random access memory can include a controller database. The controller database is a data storage and retrieval system. The controller database can store information about the data storage system.

The read only memory can include a software for operating the control unit. The software is executable code for implementing the intelligence of the data storage system.

The controller can include an error correction code unit coupled to the control unit. The error correction code unit is a processing hardware for calculating an error correction code value that can be used to detect errors, correct errors, or a combination thereof in data stored or transmitted from the memory array.

The error correction code unit can calculate one or more error correction code values using different techniques such as a Reed-Solomon code, a Hamming code, a Bose-Chauduri-Hocquenghem (BCH) code, or a combination thereof. Although the error correction code unit is a dedicated element for calculating error correction codes, it is understood that error correction codes can also be calculated in other ways, such as using the control unit to calculate error correction codes.

The controller can include the host interface coupled to the host device via a digital connection. The host device is a computing device that can use the data storage system for storing data. For example, the host device can be a laptop computer, a desktop computer, a server, a smart phone, or a combination thereof.

The host interface can communicate commands and data between the host device and the controller with the digital connection. For example, the host interface can detect a connection to the host device and generate command based on the connection to the host device.

The data storage system can be connected to the host device with the digital connection. The digital connection is a communication link for transferring digital information between the data storage system and the host device.

The digital connection can be formed in a variety of ways. For example, the digital connection can be a universal serial bus (USB) connection for transferring information. In another example, the digital connection can be a wireless communication mechanism, such as Wireless Fidelity (Wi-Fi), infrared communication mechanism, optical communication system, near field communication system, or a combination thereof.

Figure 2:
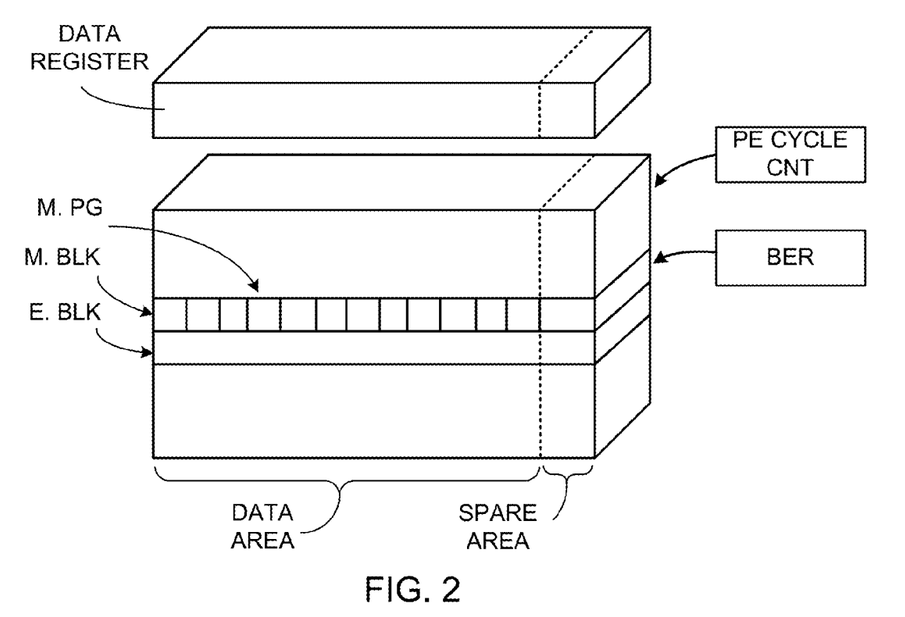
FIG. 2 is an example of a memory diagram of the data storage system.

Referring now to FIG. 2, therein is shown an example of a memory diagram of the data storage system of FIG. 1. The memory diagram shows the data storage system including memory pages, memory blocks, and a data register. The data storage system can be formed using the memory dice of FIG. 1. The memory dice include the memory cells of FIG. 1 for storing data.

The data storage system can have a variety of storage capacities determined by the number of the memory dice used to form the data storage system. For example, the data storage system can include 2 gigabytes (GB) of flash memory, 8 GB, 16 GB, or other memory sizes.

The data storage system can include a number of the memory blocks. The memory blocks are portions of the memory array of FIG. 1. For example, the data storage system with capacity of 2 GB can have 4,096 of the memory blocks.

The memory blocks can include erase blocks. The erase blocks are the smallest unit of memory that can be erased as a single entity at one time.

Each of the erase blocks can have a program erase cycle count. When one of the erase blocks is erased, then the program erase cycle count can be incremented. The program erase cycle count can represent the age or level of wear of one of the memory blocks. The program erase cycle count is a measure of the level of usage within one of the erase blocks. The flash memory devices, such as NAND flash, have a limited number of useful program erase cycles.

The memory blocks can be divided into the memory pages. The memory pages are the smallest group of data bytes that can be read or written in the data storage system. The memory pages are the smallest addressable unit of memory that can be programmed. For example, each of the memory blocks can have 64 of the memory pages.

The memory pages include a data area and a spare area. The data area is a group of memory cells used to store user data. The data area can be various sizes. For example, the data area of one of the memory pages can be bytes.

The spare area is a group of memory cells to store metadata about the data area. For example, the spare area can include error correction code information, status information, or a combination thereof. The spare area can have a variety of sizes. For example, the spare area can be bytes. The memory pages can have a size of bytes for the data area and the spare area.

The memory array of FIG. 1 can be updated by erasing the memory blocks and programming new data into the memory blocks that have been erased. Programming the memory blocks writes data into the memory blocks.

Reading one of the memory pages can result in reading errors where one or more of the bits in the memory pages are incorrect. The number of individual bit errors in a stream of data is described as a bit error rate. The bit error rate is defined as numbers of incorrect bits in a data stream stored in the data storage system. The incorrect bits can be detected within a code word protected by an error-correcting code.

The code word refers to a group of data bytes covered by a single instance of multiple ECC parity words. The error-correcting code refers to parity or redundant data generated over a set of host or user data grouped into the code word. The bit error rate is the number of incorrect bits in a data stream stored in the flash memory.

The data storage system can be divided into two physical planes. The planes can include all odd numbered blocks and all even numbered blocks, respectively. Configuring the data storage system into multiples of the planes can allow concurrent access to each plane to increase performance. With the data storage system configured with two of the planes, the data storage system can perform two concurrent reads, perform two concurrent erase operations, program two pages concurrently, or a combination thereof. Each individual operation can be performed on the memory blocks of one of the planes. The data storage system is described with two of the planes, but it is understood that more than two planes can be configured.

Figure 3:
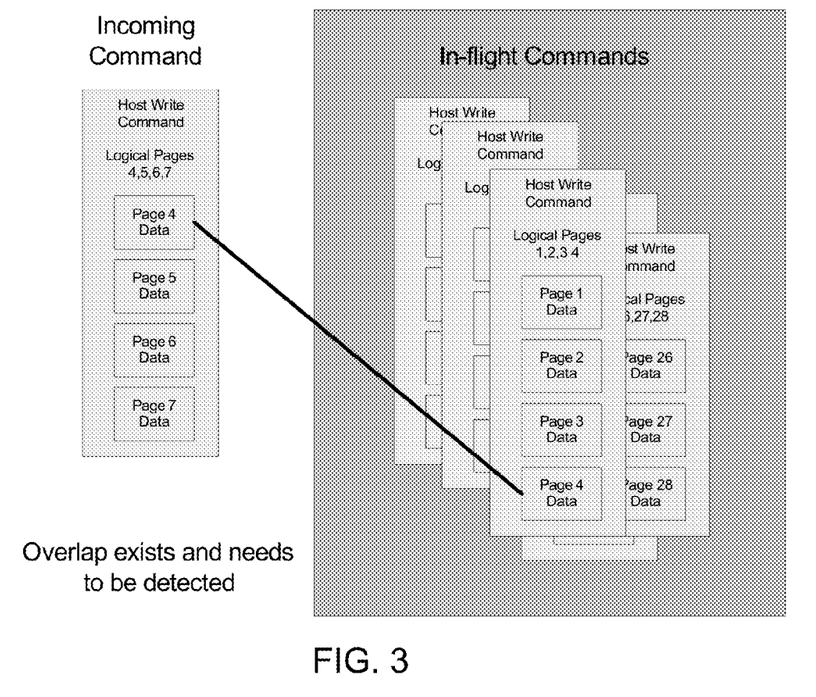
FIG. 3 is an example of a command overlap.

Referring now to FIG. 3, therein is shown an example of command overlap. The incoming command queue can include multiple host write commands that each have an associated target logical page. One of the host write commands can overlap another of the host write command if both of the write commands target the same logical page.

The overall detection process can efficiently execute host commands when there are multiple host commands that the SSD is working on at a time. In the data storage system it is advantageous to perform multiple host commands from the command queue at once from the host's perspective. In addition, it is advantageous to declare a command completed to the host once the command's data is guaranteed to be protected even before the SSD is finished working on it. The data storage system can get another host command to start working on and work on even more commands at once.

However, declaring a command complete early requires that once a command is declared complete, the original ordering between writes and reads, and writes and other writes, to the same address space must be preserved to ensure data integrity. Write commands to the same locations must preserve data chronology and any reads must return the data from the last completed write.

Because of the parallel operating nature of the SSD, not all commands are processed in sequential order. One way to preserve the ordering of commands to the same address space is to check if a command which uses the same address space is already being processed and to manage the dispatch of the command. For example, if overlap is detected, then the command can be managed by being stalled, prioritized, resequenced, modified, or a combination thereof.

One type of traditional overlap detection process can check for existing operations to the same address space. The most common way to handle this issue is to keep a list of logical addresses which have outstanding operations and to check against this list when new operations are enqueued.

Another type of traditional overlap detection process can be performed by creating a table, which holds the maximum number of outstanding write commands at any time and then entering and removing the entries from the table as they move through the data storage system. The traditional overlap detection processes can be slow when implemented in software. Performing traditional overlap detection in hardware can provide improved input-output performance by trading flexibility in the number of entries the table can support and where in the SSD pipeline the traditional overlap detection can be performed.

However, even in hardware, a traditional detection engine can take a noticeable amount of time at high queue depths. Each new command's address range must be compared to all other outstanding commands' address ranges to check for overlap. The stale flag overlap detection process can provide a mechanism to detect overlap at hardware speeds with the flexibility of running in software.

Figure 4:
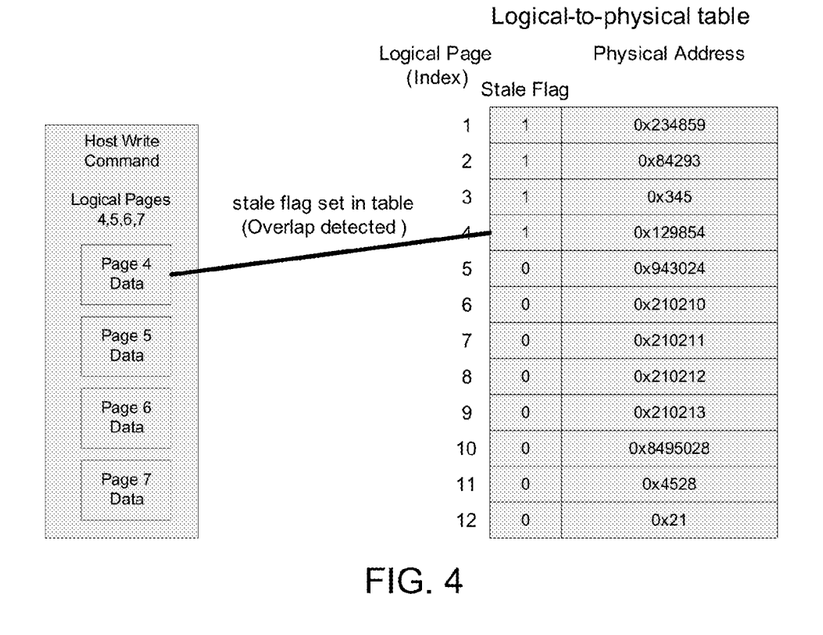
FIG. 4 is an example of the logical-to-physical table.

Referring now to FIG. 4, therein is shown an example of the logical-to-physical table. The data storage system can perform stale flag overlap detection using the logical-to-physical table that has been enhanced with a stale flag.

Stale flag overlap detection can be performed using a direct access table where every logical page address in the system maps to a unique memory page location in the table. Such a mapping table provides fast, single access detection of an existing entry. The logical-to-physical table can provide mapping for 100% of the logical pages.

The mapping table with a single entry for every possible logical address would consume a large amount of memory for a high capacity drive. However, the logical-to-physical table of the data storage system contains an entry for every single logical address to map the logical address space to the physical address space. Because not all of the bits in the logical-to-physical table are required to address the full physical address space, an additional field can be added to the logical-to-physical table to provide the stale flag.

The logical-to-physical table can reside in the random access memory, such as double data rate RAM (DDR), to provide fast access to the mapping information. The size of the random access memory must be sufficient to map the logical-to-physical table. The logical-to-physical table can require local storage memory sized at approximately 0.1% of the logical address space of the data storage system for the logical-to-physical table. For example, a 100 GB SSD needs 100 MB of RAM to accommodate the logical-to-physical table.

The logical-to-physical table can be stored and retrieved in a variety of ways. The logical-to-physical table can be stored in non-volatile memory and retrieved as needed. In another example, the logical-to-physical table can be stored in other non-volatile storage media such as magnetoresistive RAM, ferroelectric RAM, or a combination thereof. The logical-to-physical table is a linear address space than can be accessed in a random access fashion.

The data storage system can rebuild the logical-to-physical table at power up time by recovering the logical-to-physical information from the redundant storage areas including the log file, the super blocks, and the physical blocks. When the data storage system has completed rebuilding the logical-to-physical table, a logical-to-physical table ready signal can be generated to communicate the status of the logical-to-physical table. In addition, all of the stale flags can be reset at power up time.

Portions of the logical-to-physical table can be stored in the non-volatile memory units to provide data integrity and recovery. For example, portions of the logical-to-physical table can be recovered using the log file. In another example, portions of the logical-to-physical table can be stored in the footer of the super blocks, and the logical addresses can be stored in the physical pages as well. The logical-to-physical table is stored redundantly within the data storage system.

It has been discovered that adding a stale flag field to each table entry in the logical-to-physical table can increase data transfer performance. Using the stale flag to indicate that the physical address entry in the table is in-process and has not yet been written to flash, even though it has been completed to the host, can allow multiple operations to be performed simultaneously. Because the stale flag indicates the data address is no longer accurate but the new data is in-flight, the overlap condition can be detected with a single memory read.

It has been discovered that the stale flag can be added to the logical-to-physical table to increase data transfer performance with minimal overhead. The logical-to-physical table includes additional unused memory space, so the stale flag can provide complete coverage by associating each address with the stale flags without an additional table.

Figure 5:
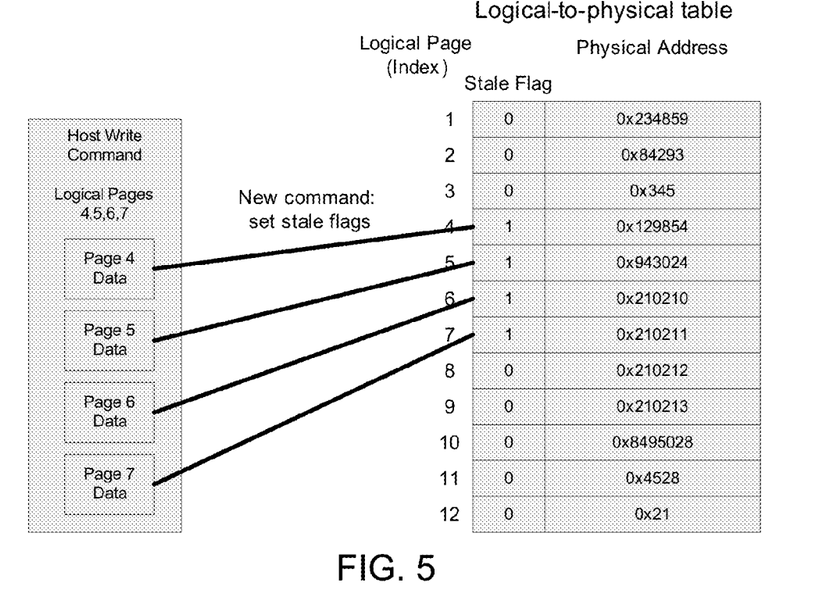
FIG. 5 is a first example of the write process.

Referring now to FIG. 5, therein is shown a first example of the write process. The write process can write to one of the logical pages.

The first step in the write process is to check the logical-to-physical table for all of the physical addresses of the write commands for any positively set values of the stale flag. If the stale flag is not set then the logical-to-physical table can set the stale flag portion of the current entry and release the command to be processed. If the stale flag is already set then the data storage system can perform a write-merge operation to consolidate the outstanding write operations.

Figure 6:
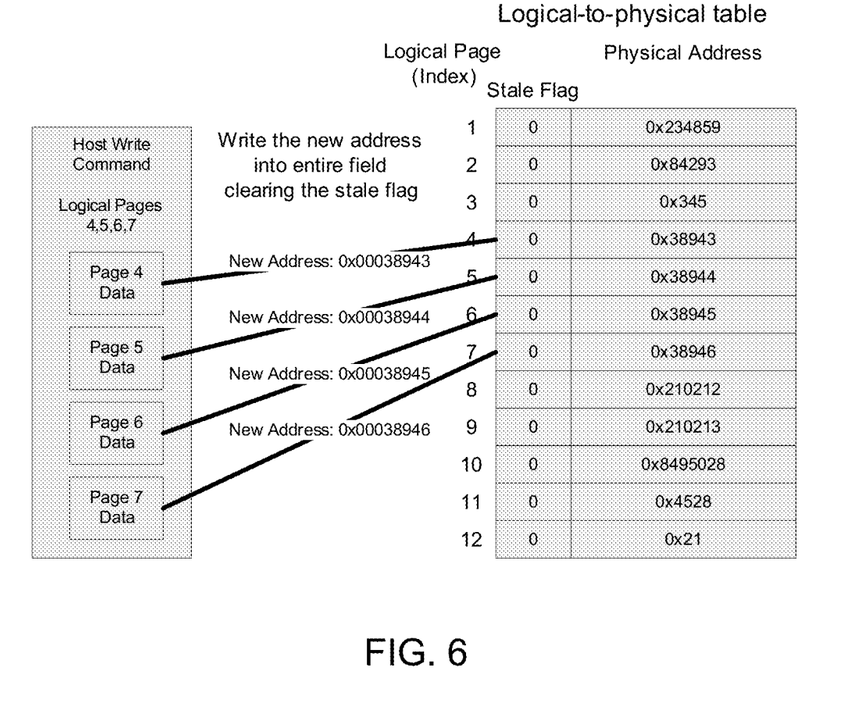
FIG. 6 is a second example of the write process.

Referring now to FIG. 6, therein is shown a second example of the write process. The write process can update the stale flag of the logical-to-physical table.

When the write command completes, the logical-to-physical table can be updated with the new physical address. When the address is updated, the stale flag can be cleared simultaneously. Clearing the stale flag in a blanket fashion provides that there can be only one version of the write data in-flight at a given time. It is possible to make the stale flag a count to address multiple versions but there is always an upper limit based on the number of bits available to the stale flag. Although a single bit implementation is described, it is understood that a multiple bit implementation would also be valid to increase the number of in-flight versions allowed.

The command queue can buffer a number of write commands. For example, the data storage system can typically buffer 32 to 300 write commands. However, it is understood that the data storage system can be configured to accommodate any number of write commands subject to the amount of physical memory available for the command queue. The number of write commands buffered can be based on the amount of data that can be stored when a power failure occurs. The number of write commands buffered can be based on the amount of capacitive power available for power failure operations.

Figure 7:
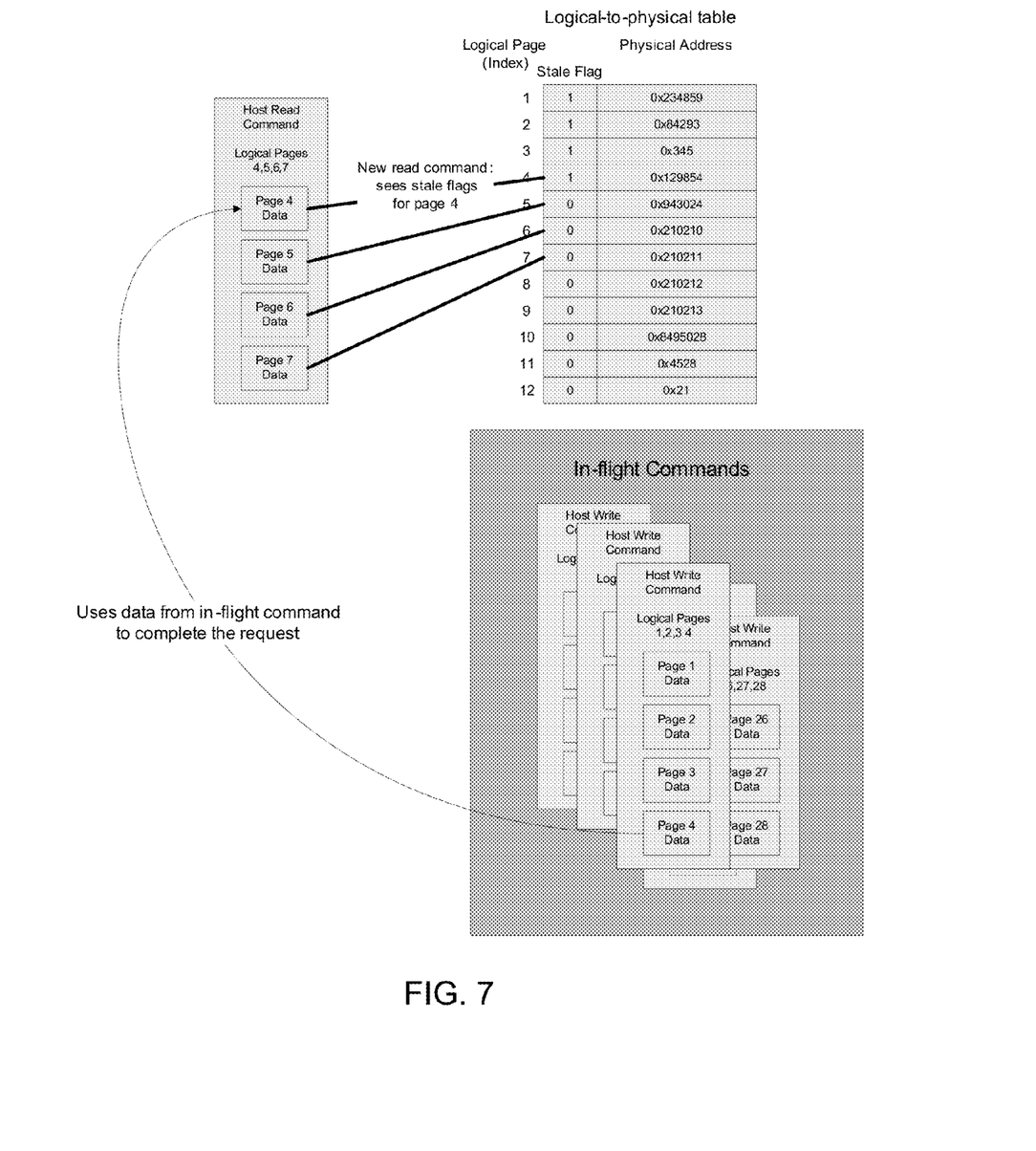
FIG. 7 is an example of the read process.

Referring now to FIG. 7, therein is shown an example of the read process. The read process can read the logical pages in an overlap situation.

When a read command is processed, the read command must access the logical-to-physical table to identify which memory it should access to service the read. Since the stale flag is a part of that table, there are no additional reads required for the read command to detect the overlap.

If the read command is seen and the stale flag is set, there are a few options for the data storage system to proceed. 1) The drive skips over that particular read until the flag in the table is cleared by the write, this is only reasonable if the write is guaranteed to be processed sufficiently quickly to allow the read to complete without breaking latency requirements. 2) The detection of the stale flag by a read command can trigger the stale write to be prioritized so that the stale flag will be cleared in short order. 3) The read command can be serviced by returning the in-flight write data for the same address space.

Protecting the data with the stale flag can suffer a performance hit when large block writes are in-flight and the drive must update the stale flag for each logical page within the range. To reduce the impact of updating all of the stale flags in a large range, a binary hybrid approach can be implemented where the drive switches between using traditional overlap detection for large block accesses and logical-to-physical table based stale flag overlap detection when small block operations are being processed.

The data storage system can also include a separate table, such as a stale table, for mapping the stale flag information. The stale table can be highly compressed. The separate table can encode the entire logical address space for mapping into the logical-to-physical table. The separate table could provide compression by mapping multiple stale flags into a single memory word.

This means that with larger transfer sizes, multiple logical pages per host request, the separate table approach can reduce memory accesses. It also preserves the constant cost of overlap detection in the main process. The separate table process can be beneficial at very high queue depths. Thus, having a separate table for stale flags is a viable variation for overlap detection.

The stale flag information can be spare data with a few values spread out over a large number of entries. For example, for a drive having 20 million logical pages can have approximately 100 stale pages.

It has been discovered that using the logical-to-physical table enhanced with the stale flag provides an efficient process for stale flag overlap detection. Allocating the stale flag in the logical-to-physical tabling system can quickly detect overlap in a single lookup operation.

Because the stale flag is co-located with a logical-to-physical entry, multiple memory accesses can be reduced and additional memory is not required to support the invention. Using the stale flag increases the visibility of valid and invalid/stale data.

In an illustrative example, the stale flag can be co-located in a separate table that tracks the logical-to-physical table. The separate table could be placed in a different memory location than the logical-to-physical table and compressed to use less memory by using a single bit to represent every logical page.

The separate table could use the compressed bit fields to provide efficient ways to check bits with large reads and writes. If the stale flag is set, the pass over recycling operations may be redundant. For example, sign checking or non-zero status checking can be used to increase performance and reduce compute cycles.

The stale flag can also be stored in a multi-level independent stale flag table where the top most level splits the logical space of the drive into different partitions. For example, the top most level can include 100 pieces or partitions.

The entries in each of the multi-level tables can point to another table which further subdivides the logical space into different hierarchical levels. The final hierarchical table can include the stale flag location for each individual logical page.

It has been found that using the hierarchical multi-level tables to encode the stale flag for each individual logical page can increase performance by reducing the overall data footprint. Each of the tables can be resident in random access memory only if it includes a stale flag within its range of the table. If the table is not in memory, then it can be determined to not be stale.

Because the stale flags are sparsely populated, the overall data requirements are minimized and the pertinent tables can be kept in faster memory, such as SRAM. The stale flag overlap detection performance is increased because only one read for every level of the table is required to detect an overlap. Adding a new stale flag requires creating new table portions if they do not exist and marking the stale flag in the lowest level table.

During garbage collection operations for recycling memory, the garbage collection process can use the stale flag to increase performance. If the stale flag is set, then the garbage collection process can skip the recycle write step for some of the memory pages. For example, if the stale flag is set, then the recycle read operations does not need to be performed because there is no need to move the old data. If the stale flag is not set, then the recycle read can read the logical block and write the logical block in a new location.

Merging multiple write operations can reduce write amplification. Because the data from several planned write commands and new data write commands going to the same location can be consolidated, there are fewer write operations overall.

It has been found that having the stale flag directly associated with the logical-to-physical table can reduce the number of drive access operations. The number of operations needed for stale flag overlap detection is on the order of one (O(1)) with respect to queue depth, where traditional algorithms are on the order of N (O(n)) with respect to queue depth.

The data storage system includes a number of functions for stale flag overlap detection. One of the functions schedules the execution of commands in the command queue. Another of the functions groups detects write commands that share a logical address target. Another of the functions can read the logical blocks based on the stale flag of the logical-to-physical table.

The functions described above provide a process, implemented in the elements of the data storage system that are different for specific applications or purposes. For example, the process can form the data storage system with the components or the non-volatile memory devices that are more capable and another group of the drives with the components that are less capable. The features described above can build the data storage system that can use a predetermined wide range of component and system characteristics to help improve the performance and operational integrity.

The data storage system can reconfigure and recycle the memory elements, such as the erase blocks, based on the operational capabilities of the data storage system. The memory elements are continuously regrouped, recycled, or reformed into arrangements to get performance, endurance, and reliability of the data storage system. In other words, the memory elements are not all treated or determined to be identical as they are being used during the runtime operations.

Functions or operations of the controller of the data storage system as described above can be implemented using modules. The functions or the operations of the controller can be implemented in hardware, software, or a combination thereof. The modules can be implemented using the control unit, the read only memory unit, the random access memory unit, the memory interface unit, the host interface unit, the ECC unit, or a combination thereof.

The data storage system is described with module functions or order as an example. The modules can be partitioned differently. Each of the modules can operate individually and independently of the other modules.

Further, data generated in one module can be used by another module without being directly coupled to each other. Yet further, the modules can be implemented as hardware accelerators (not shown) within the control unit or can be implemented as hardware accelerators in the controller or outside of the controller. The controller can be coupled to the memory array and the host. The control unit can be coupled to the host interface, the memory interface, the ECC unit, the read only memory, and the random access memory.

The physical transformation of determining the configuration of the data bits in the memory blocks of the data storage system results in movement in the physical world, such as people using the data storage system based on the operation the stale flag and the logical-to-physical table. As the movement in the physical world occurs, the movement itself creates additional information that is converted back to assigning the user data. The use of the updated user data during the runtime operations of the data storage system can continue the movement in the physical world. For example, the data storage system can be physically moved between different hosts to transfer data bits that are encoded in the data storage system from one system to another.

Figure 8:
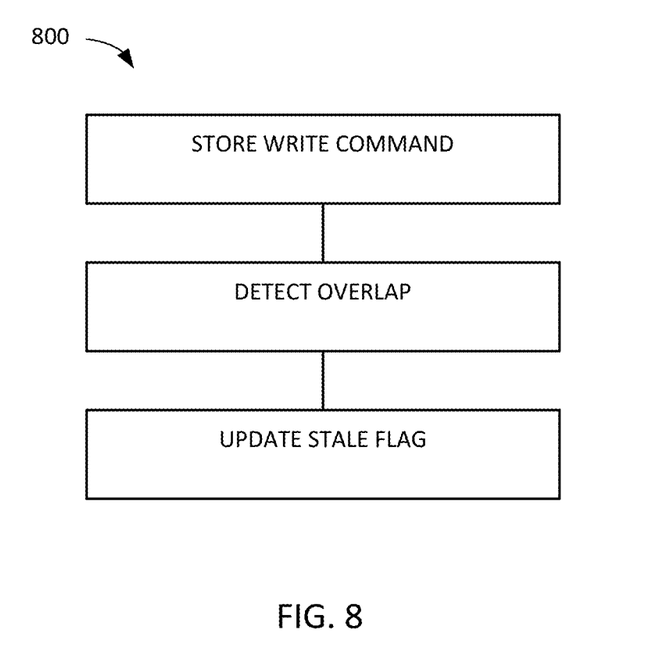
FIG. 8 is a flow chart of a method of operation of the data storage system in a further embodiment of the present invention.

Referring now to FIG. 8, therein is shown a flow chart of a method of operation of the data storage system of FIG. 1 in a further embodiment of the present invention. The method includes: storing a write command for a logical address of a memory block in a block; detecting an overlap based on the write command in a block; and updating a stale flag in a logical-to-physical table based on the overlap in a block.

Thus, it has been discovered that the data storage system of the present invention furnishes important and heretofore unknown and unavailable solutions, capabilities, and functional aspects for a data storage system with stale data mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

It will be understood that, although the terms "first," "second," etc. may be used herein to describe various elements, these elements should not be limited by these terms. These terms are only used to distinguish one element from another. For example, a first command could be termed a second command, and, similarly, a second command could be termed a first command, without changing the meaning of the description, so long as all occurrences of the "first command" are renamed consistently and all occurrences of the "second command" are renamed consistently. The first command and the second command are both commands, but they are not the same command.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of operation of a data storage system comprising:
    receiving a write command specifying a logical address to which to write;
    determining whether a stale flag corresponding to the logical address is set;
    in accordance with a determination that the stale flag is not set, setting the stale flag and releasing the write command to be processed;
    in accordance with a determination that the stale flag is set, detecting an overlap, wherein the overlap indicates two or more outstanding write commands are operating on the same memory space;
    receiving a read command specifying a second logical address from which to read;
    determining whether a second stale flag corresponding to the second logical address is set;
    in accordance with a determination that the second stale flag is not set, performing the read command, wherein performing the read command includes reading data from a physical address corresponding to the second logical address, wherein the physical address is determined using a logical-to-physical table; and
    in accordance with a determination that the second stale flag is set, skipping performance of the read command until the second stale flag is not set.

2. The method of claim 1, further comprising:
    in response to detecting an overlap, performing a write-merge operation in random access memory, wherein the write-merge operation consolidates the two or more outstanding write commands to the logical address.

3. The method of claim 1, further comprising:
    completing processing of the write command; and
    updating the stale flag.

4. The method of claim 3, wherein updating the stale flag includes clearing the stale flag.

5. The method of claim 3, wherein the stale flag is a count of a number of outstanding write commands associated with a respective logical address, and updating the stale flag includes decrementing the count.

6. The method of claim 1, wherein determining whether the stale flag corresponding to the logical address is set includes retrieving a value of the stale flag corresponding to the logical address from the logical-to-physical table.

7. The method of claim 6, further comprising:
    in accordance with a determination that the second stale flag is set, prioritizing a stale write, wherein completion of the stale write clears the second stale flag.

8. The method of claim 1, wherein each logical address of a plurality of logical addresses has a corresponding stale flag and each stale flag is stored in the logical-to-physical table used for mapping logical addresses to physical addresses.

9. A method of operation of a data storage system, comprising:
    receiving a write command specifying a logical address to which to write;
    determining whether a stale flag corresponding to the logical address is set;
    in accordance with a determination that the stale flag is not set, setting the stale flag and releasing the write command to be processed;
    in accordance with a determination that the stale flag is set, detecting an overlap, wherein the overlap indicates two or more outstanding write commands are operating on the same memory space;
    receiving a read command specifying a second logical address from which to read;
    determining whether a second stale flag corresponding to the second logical address is set;
    in accordance with a determination that the second stale flag is not set, performing the read command, wherein performing the read command includes reading data from a physical address corresponding to the second logical address, wherein the physical address is determined using a logical-to-physical table; and
    in accordance with a determination that the second stale flag is set, servicing the read command by reading data from in-flight write data for the second logical address.

10. A data storage system comprising:
    one or more processors; and
    memory storing one or more programs to be executed by the one or more processors, the one or more programs comprising instructions for:
        receiving a write command specifying a logical address to which to write;
        determining whether a stale flag corresponding to the logical address is set;
        in accordance with a determination that the stale flag is not set, setting the stale flag and releasing the write command to be processed;
        in accordance with a determination that the stale flag is set, detecting an overlap, wherein the overlap indicates two or more outstanding write commands are operating on the same memory space;
        receiving a read command specifying a second logical address from which to read;
        determining whether a second stale flag corresponding to the second logical address is set;

in accordance with a determination that the second stale flag is not set, performing the read command, wherein performing the read command includes reading data from a physical address corresponding to the second logical address, wherein the physical address is determined using a logical-to-physical table; and in accordance with a determination that the second stale flag is set, skipping performance of the read command until the second stale flag is not set.

11. The data storage system of claim 10, wherein the one or more programs further comprise instructions for:

in response to detecting an overlap, performing a write-merge operation in random access memory, wherein the write-merge operation consolidates the two or more outstanding write commands to the logical address.

12. The data storage system of claim 10, wherein the one or more programs further comprise instructions for:

completing processing of the write command; and
updating the stale flag.

13. The data storage system of claim 10, wherein determining whether the stale flag corresponding to the logical address is set includes retrieving a value of the stale flag corresponding to the logical address from a logical-to-physical table.

14. The data storage system of claim 13, wherein the one or more programs further comprise instructions for:

in accordance with a determination that the second stale flag is set, prioritizing a stale write, wherein completion of the stale write clears the second stale flag.

15. A data storage system comprising:

one or more processors; and memory storing one or more programs to be executed by the one or more processors, the one or more programs comprising instructions for:

receiving a write command specifying a logical address to which to write;

determining whether a stale flag corresponding to the logical address is set;

in accordance with a determination that the stale flag is not set, setting the stale flag and releasing the write command to be processed;

in accordance with a determination that the stale flag is set, detecting an overlap, wherein the overlap indicates two or more outstanding write commands are operating on the same memory space;

receiving a read command specifying a second logical address from which to read;

determining whether a second stale flag corresponding to the second logical address is set;

in accordance with a determination that the second stale flag is not set, performing the read command, wherein performing the read command includes reading data from a physical address corresponding to the second logical address, wherein the physical address is determined using a logical-to-physical table; and in accordance with a determination that the second stale flag is set, servicing the read command by reading data from in-flight write data for the second logical address.

16. A non-transitory computer readable storage medium, storing one or more programs configured for execution by one or more processors of a data storage system, the one or more programs including instructions for:

receiving a write command specifying a logical address to which to write;

determining whether a stale flag corresponding to the logical address is set;

in accordance with a determination that the stale flag is not set, setting the stale flag and releasing the write command to be processed;

in accordance with a determination that the stale flag is set, detecting an overlap, wherein the overlap indicates two or more outstanding write commands are operating on the same memory space;

receiving a read command specifying a second logical address from which to read;

determining whether a second stale flag corresponding to the second logical address is set;

in accordance with a determination that the second stale flag is not set, performing the read command, wherein performing the read command includes reading data from a physical address corresponding to the second logical address, wherein the physical address is determined using a logical-to-physical table; and in accordance with a determination that the second stale flag is set, skipping performance of the read command until the second stale flag is not set.

17. The non-transitory computer readable storage medium of claim 16, wherein the one or more programs further include instructions for:

in response to detecting an overlap, performing a write-merge operation in random access memory, wherein the write-merge operation consolidates the two or more outstanding write commands to the logical address.

18. The non-transitory computer readable storage medium of claim 16, wherein the one or more programs further include instructions for:

completing processing of the write command; and
updating the stale flag.

19. The non-transitory computer readable storage medium of claim 16, wherein determining whether the stale flag corresponding to the logical address is set includes retrieving a value of the stale flag corresponding to the logical address from a logical-to-physical table.

20. A non-transitory computer readable storage medium, storing one or more programs configured for execution by one or more processors of a data storage system, the one or more programs including instructions for:

receiving a write command specifying a logical address to which to write;

determining whether a stale flag corresponding to the logical address is set;

in accordance with a determination that the stale flag is not set, setting the stale flag and releasing the write command to be processed;

in accordance with a determination that the stale flag is set, detecting an overlap, wherein the overlap indicates two or more outstanding write commands are operating on the same memory space;

receiving a read command specifying a second logical address from which to read;

determining whether a second stale flag corresponding to the second logical address is set;

in accordance with a determination that the second stale flag is not set, performing the read command, wherein performing the read command includes reading data from a physical address corresponding to the second logical address, wherein the physical address is determined using a logical-to-physical table; and in accordance with a determination that the second stale flag is set, servicing the read command by reading data from in-flight write data for the second logical address.

* * * * *